United States Patent [19]

Zander et al.

[11] Patent Number: 5,842,072
[45] Date of Patent: Nov. 24, 1998

[54] CAMERA WITH VIEWING OPENING EXTENDED TO HOLD LABEL

[75] Inventors: Dennis R. Zander, Penfield; John K. Erickson, Victor, both of N.Y.

[73] Assignee: Eastman Kodak Company, Rochester, N.Y.

[21] Appl. No.: 910,126

[22] Filed: Aug. 12, 1997

[51] Int. Cl.⁶ .................................................. G03B 17/02
[52] U.S. Cl. .......................... 396/535; 396/537; 396/538
[58] Field of Search ...................... 396/207, 281, 396/284, 439, 511, 535, 536, 537, 538

[56] References Cited

U.S. PATENT DOCUMENTS

| | | | |
|---|---|---|---|
| 2,714,844 | 8/1955 | Heidecke | 396/284 |
| 2,938,441 | 5/1960 | Klingenstein | 294/139 |
| 3,260,182 | 7/1966 | Nerwin | 396/535 |
| 4,469,423 | 9/1984 | Bresson | 396/137 |
| 4,497,556 | 2/1985 | Edwards | 396/511 |
| 4,645,321 | 2/1987 | Fukita | 396/423 |
| 5,262,814 | 11/1993 | Nishio et al. | 396/537 |

*Primary Examiner*—Eddie C. Lee
*Attorney, Agent, or Firm*—Roger A. Fields

[57] ABSTRACT

A camera comprising a door with an exterior viewing opening for viewing readable information appearing on a photographic article such as a film cartridge in the camera, and an interior light-trapping gasket that surrounds the viewing opening to confine ambient light entering the viewing opening when the door is closed, is characterized in that the viewing opening is extended along the door to hold a label at a particular portion of the viewing opening that does not interfere with ambient light entering the viewing opening to view the information.

9 Claims, 5 Drawing Sheets

CAMERA WITH VIEWING OPENING EXTENDED TO HOLD LABEL

FIELD OF THE INVENTION

The invention relates generally to the field of photography, and in particular to cameras. More specifically, the invention relates to a camera with a viewing opening for viewing readable information appearing on a photographic article such as a film cartridge in the camera.

BACKGROUND OF THE INVENTION

It is well known for a camera to have a door to a cartridge receiving chamber inside the camera. The door may be provided with an exterior viewing opening or window for viewing film related information on a film cartridge in the chamber. Typically, a light-trapping elastic gasket is affixed to the underside of the door to confine ambient light entering the viewing opening to the vicinity of the information.

SUMMARY OF THE INVENTION

A camera comprising a door with an exterior viewing opening for viewing readable information appearing on a photographic article such as a film cartridge in the camera, and an interior light-trapping gasket that surrounds the viewing opening to confine ambient light entering the viewing opening when the door is closed, is characterized in that:

the viewing opening is extended along the door to hold a label at a particular portion of the viewing opening that does not interfere with ambient light entering the viewing opening to view the information.

DETAILED DESCRIPTION OF THE INVENTION

Figure 1:
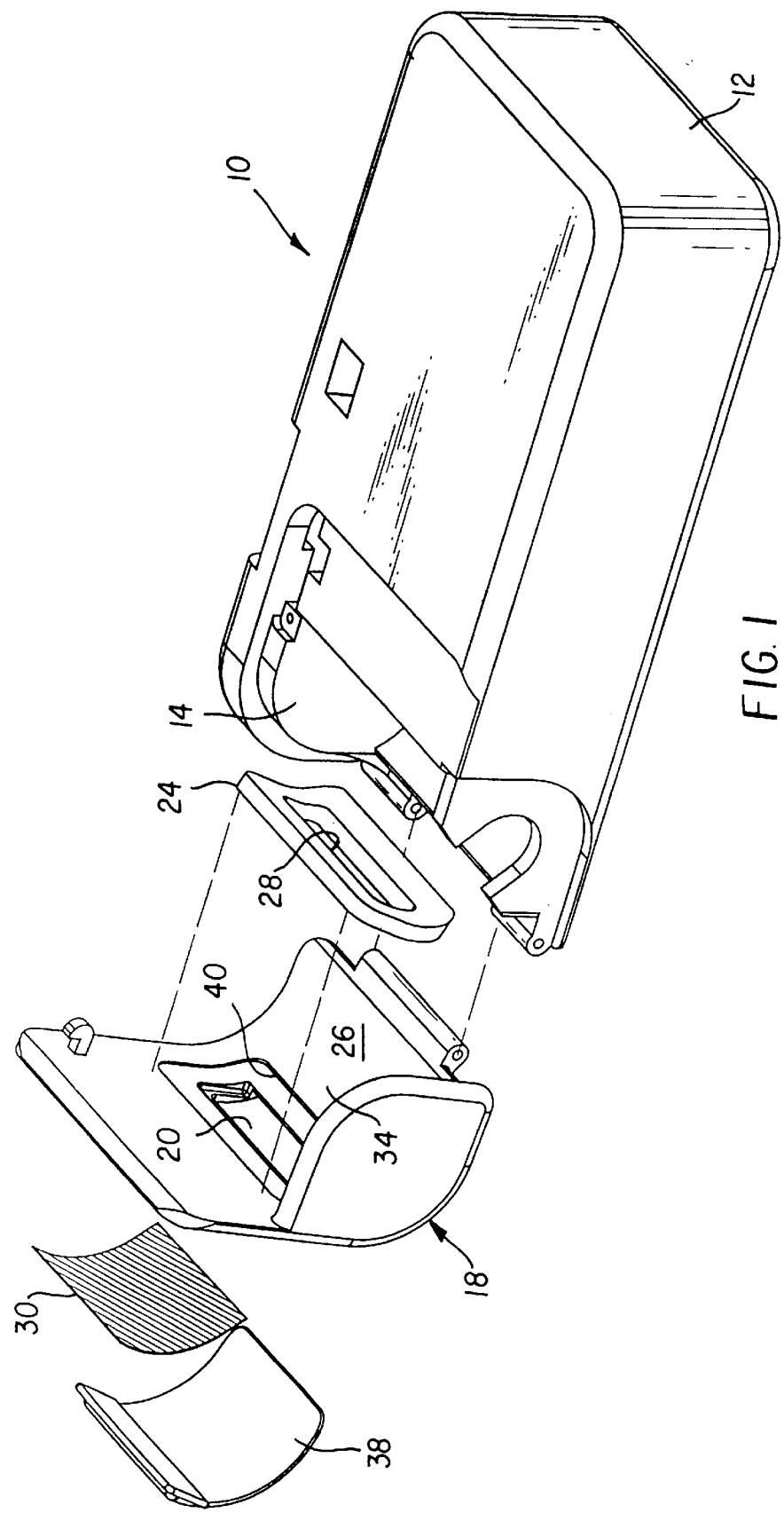
FIG. 1 is an exploded rear perspective view of a camera according to a preferred embodiment of the invention.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a camera 10 comprising a body 12 having a cartridge receiving chamber 14 for a conventional film cartridge 16. A door 18 is pivotably connected to the body 12 for opening movement to permit the film cartridge 14 to be loaded into the chamber 14.

The door 18 has an exterior viewing opening or window 20 for viewing eye-readable, film related information 22 printed on the film cartridge 14. See FIGS. 1–3. An interior elastic light-trapping gasket 24 is affixed to the underside 26 of the door 18. The gasket 24 has a view-through hole 28 which confines ambient light entering the viewing opening 20 when the door is closed.

Figure 2:
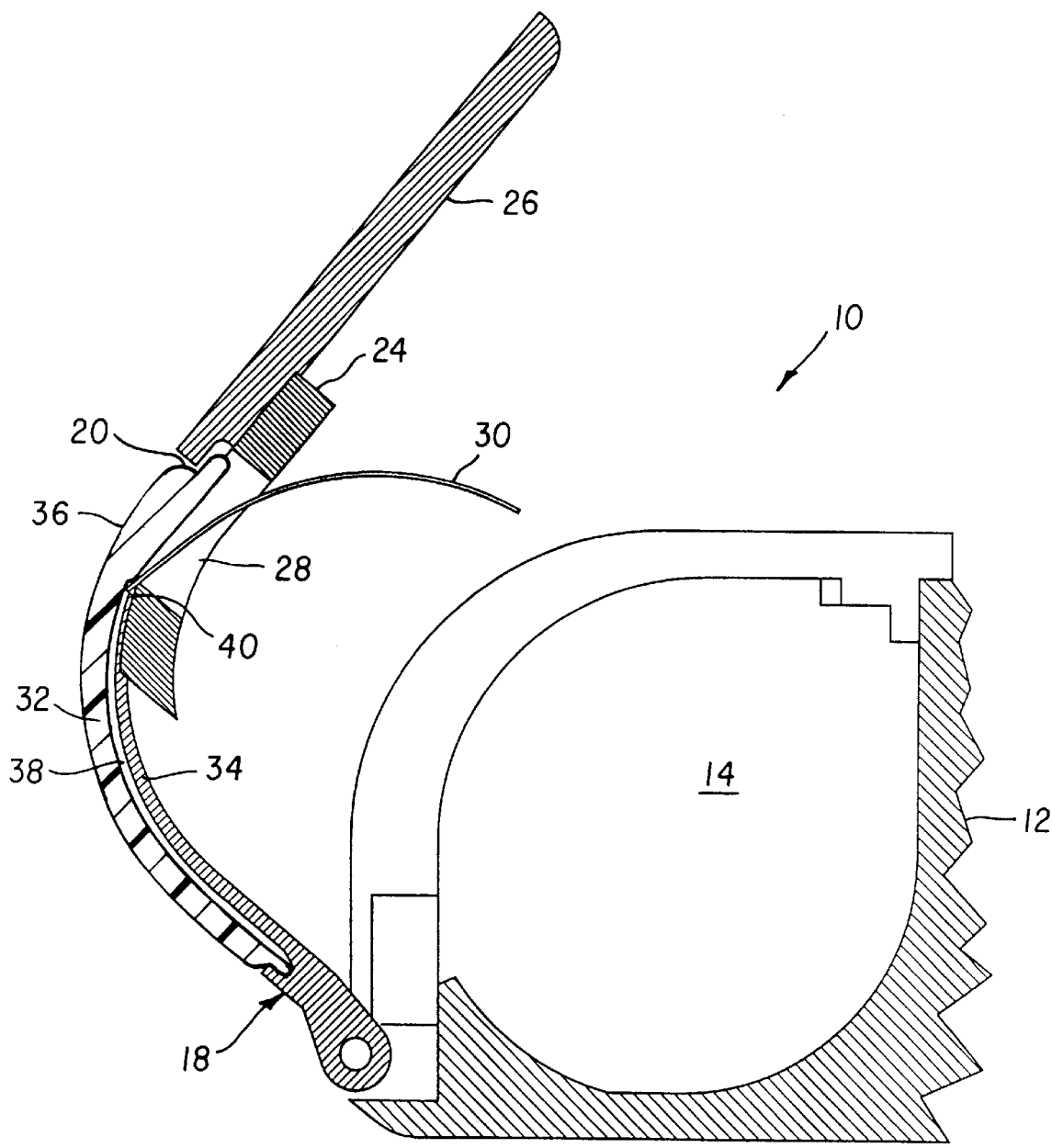
FIG. 2 is a sectional view of part of the camera, showing how a label is inserted into a slot.
Figure 3:
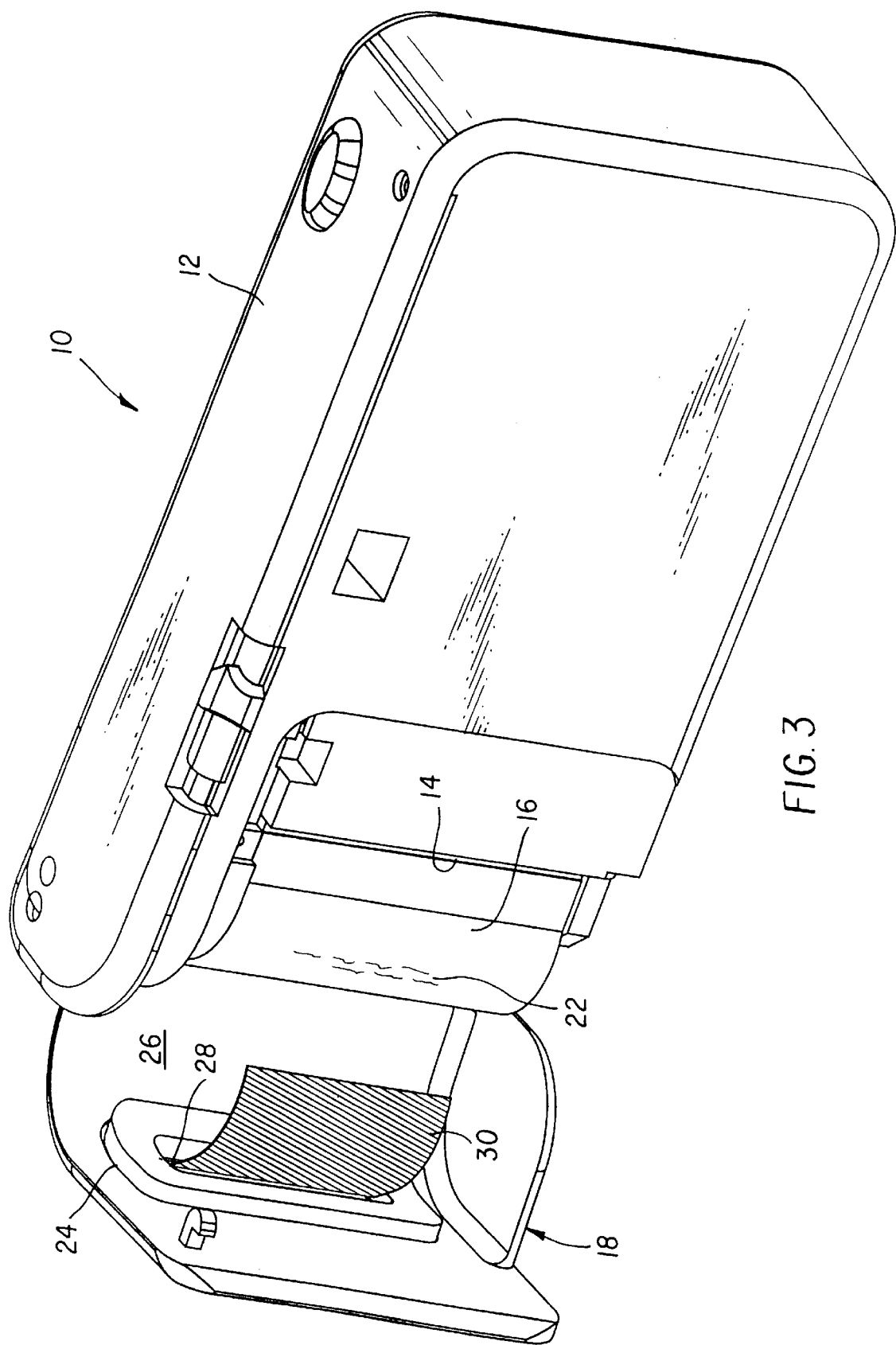
FIG. 3 is a rear perspective view of the camera, showing how the label is inserted into the slot.
Figure 4:
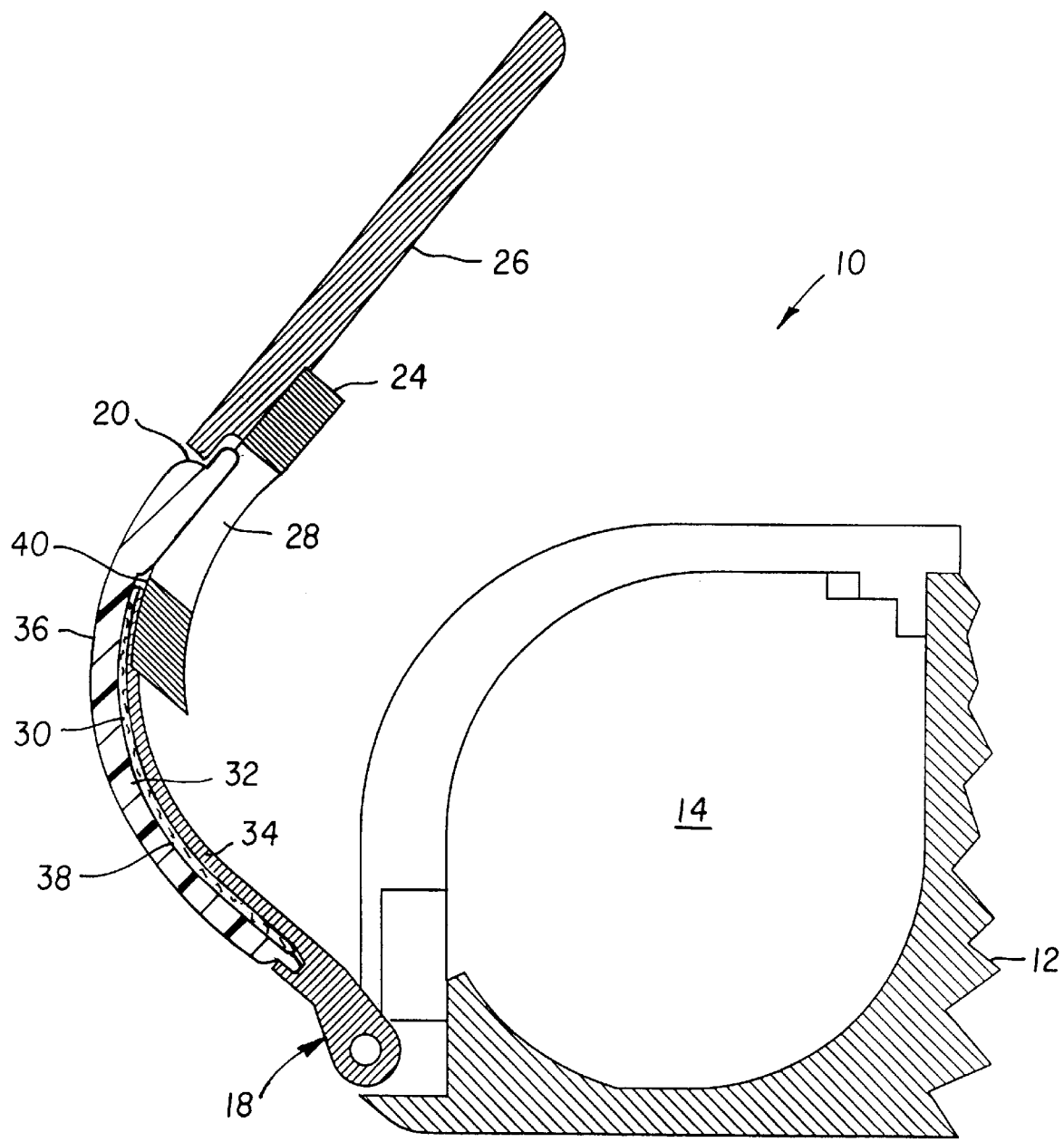
FIG. 4 is a sectional view similar to FIG. 2, showing the label in the slot.
Figure 5:
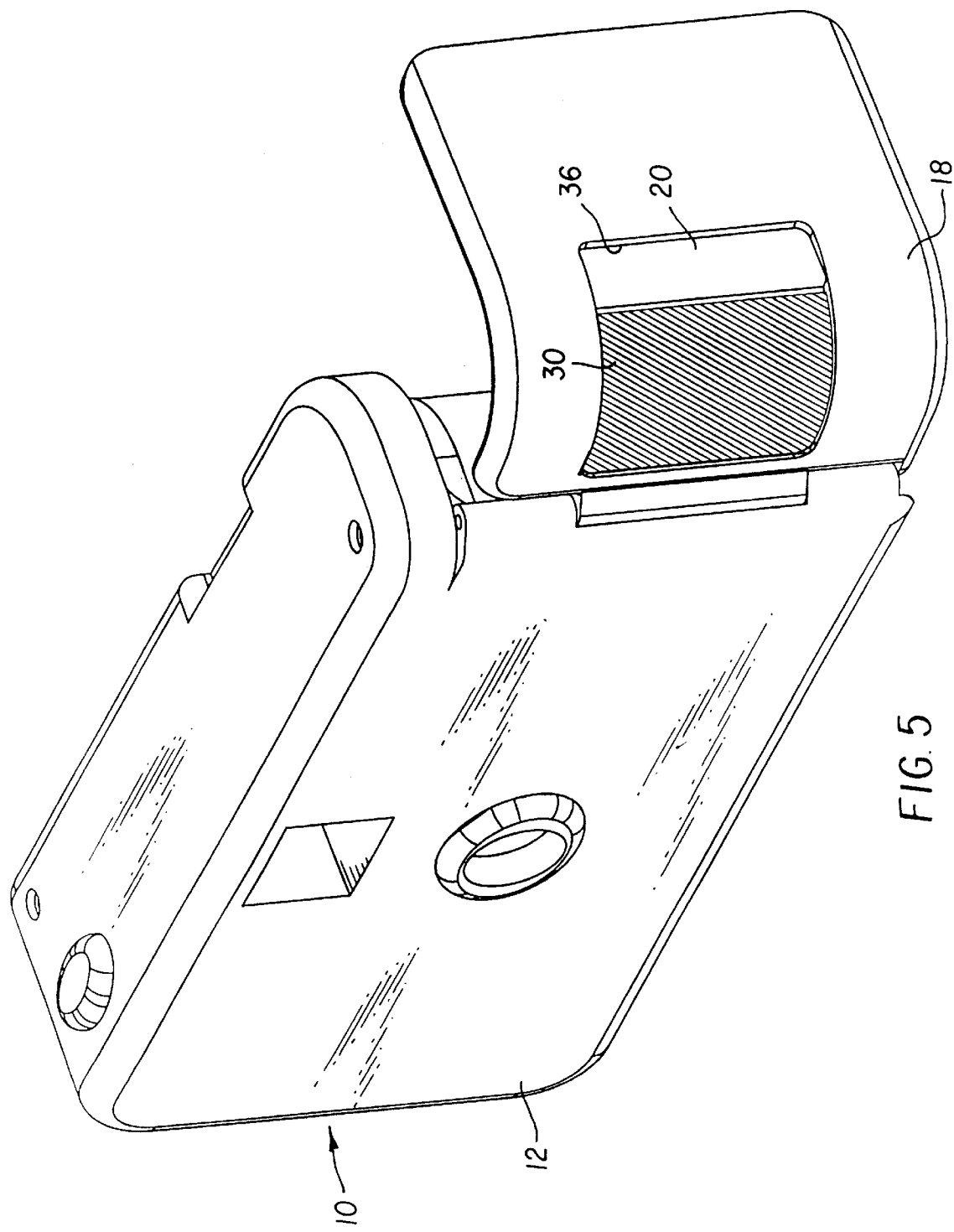
FIG. 5 is a front perspective view of the camera, showing the label in the slot.

As shown in FIGS. 2 and 4, the viewing opening 20 is extended along the door 18 to hold an information-bearing label 30 at a particular (extended) portion 32 of the viewing opening that does not interfere with ambient light entering the viewing opening to view the information 22 on the film cartridge 14. The door 18 has an interior, integral, opaque support 34 along its underside 26 that is arranged parallel to the extended portion 32 of the viewing opening 20, to support the label 30 at the extended portion. An exterior transparent cover 36, affixed to the door 18, covers the viewing opening 20 including its extended portion 32. The interior opaque support 34 and the exterior transparent cover 36 are slightly spaced apart to form a slot 38 that is coextensive with the extended portion 32 of the viewing opening 20. An ingress opening 40 to the slot 38 is located between the view-through hole 28 in the gasket 24 and the transparent cover 36 to permit the label 30 to be passed through the view-through hole to the ingress opening, as shown in FIGS. 2 and 3, and through the ingress opening into the slot, as shown in FIGS. 4 and 5, when the door 18 is open.

The invention has been described with reference to a preferred embodiment. However, it will be appreciated that variations and modifications can be effected by a person of ordinary skill in the art without departing from the scope of the invention. For example, instead of the door 18 including the integral support 34, the gasket 24 can be extended beneath the extended portion 32 of the viewing opening 20 to serve as a support for the label 30.

PARTS LIST 10. camera
12. body
14. cartridge receiving chamber
16. film cartridge
18. door
20. viewing opening
22. readable information
24. gasket
26. underside
28. view-through hole
30. label
32. extended portion of 20
34. interior opaque support
36. exterior transparent covers
38. slot
40. ingress opening

What is claimed is:

1. A camera comprising an exterior viewing opening for viewing readable information on a film cartridge when the film cartridge is in said camera, and an interior light-trapping gasket that surrounds said viewing opening to confine ambient light entering the viewing opening, is characterized in that:

a separate label apart from the film cartridge is provided for said camera; and said viewing opening is extended to be capable of holding said label at a particular portion of the viewing opening that does not interfere with ambient light entering the viewing opening to view the information on the film cartridge, whereby the label in addition to the information can be seen through said viewing opening.

2. A camera as recited in claim 1, wherein an interior support for said label is arranged parallel to said particular portion of said viewing opening at which said label is held.

3. A camera as recited in claim 2, wherein an exterior transparent cover covers said viewing opening including said particular portion of the viewing opening at which said label is held.

4. A camera as recited in claim 3, wherein said interior support and said exterior transparent cover are spaced apart to form a slot that is coextensive with said particular portion of said viewing opening at which said label is held.

5. A camera as recited in claim 4, wherein an ingress opening to said slot is located between said gasket and said transparent cover to permit said label to be inserted into the slot.

6. A camera as recited in claim 5, wherein said gasket has a view-through hole through which said label may be passed to said ingress opening to said slot.

7. A camera as recited in claim 1, wherein said gasket has a view-through hole that is positioned relative to said particular portion of said viewing opening at which said label is held to permit the label to be passed through said view-through hole to the particular portion of the viewing opening.

8. A camera comprising a door with an exterior viewing opening for viewing readable information on a film cartridge when the film cartridge is in said camera, and an interior light-trapping gasket that surrounds said viewing opening to confine ambient light entering the viewing opening when said door is closed, is characterized in that:

said viewing opening is extended along said door beyond the information on the film cartridge when the film cartridge is in said camera to be capable of holding a label separate from the film cartridge at a particular portion of the viewing opening that does not interfere with ambient light entering the viewing opening to view the information on the film cartridge.

9. A method of inserting a label into a slot which is located between an interior support for the label and an exterior transparent cover and which is coextensive with an extended portion of a viewing opening in a camera, said method comprising the step of:

passing the label through a view-through hole in a light-trapping gasket, which confines ambient light entering another portion of the viewing opening, to an ingress opening to the slot.

\* \* \* \* \*